United States Patent [19]
Marshall et al.

[11] Patent Number: 6,128,872
[45] Date of Patent: Oct. 10, 2000

[54] CABLE PROTECTION SYSTEM

[75] Inventors: Richard D. Marshall, Addlestone; Richard Bell, Watford, both of United Kingdom

[73] Assignee: Comunica PLC, Middlesex, United Kingdom

[21] Appl. No.: 09/199,601

[22] Filed: Nov. 25, 1998

[30] Foreign Application Priority Data

Nov. 28, 1997 [GB] United Kingdom ................... 9725306

[51] Int. Cl.[7] .................................................. E04B 5/48
[52] U.S. Cl. .......................................... 52/220.1; 52/220.5
[58] Field of Search ............................... 52/220.1, 220.2, 52/220.3, 220.5, 631

[56] References Cited

U.S. PATENT DOCUMENTS

| | | | |
|---|---|---|---|
| 3,848,379 | 11/1974 | Hazen | 52/220.5 |
| 4,324,078 | 4/1982 | Gray | 52/220.5 |
| 4,627,203 | 12/1986 | Presswalla et al. | 52/220.5 |
| 5,339,577 | 8/1994 | Snyder | 52/631 X |
| 5,483,776 | 1/1996 | Poppe | 52/220.3 |
| 5,544,453 | 8/1996 | Engwall | 52/220.1 X |
| 5,587,554 | 12/1996 | Kendrick, Jr. | 52/220.1 X |

*Primary Examiner*—Richard Chilcot
*Attorney, Agent, or Firm*—Fulbright & Jaworski L.L.P.

[57] ABSTRACT

The present invention relates to a cable protection system, and in particular to a cable protection system used to channel and protect cables or flexible pipes such as computer network cables, power cables, fiber optic cables, and hydraulic or pneumatic control lines laid within a cavity.

The cable protection system comprises a sheet (10) of non-metallic material which may be shaped to form a channel. The cable protection system is adapted to fit between spacing bars (18) in a false floor, wall or ceiling.

17 Claims, 1 Drawing Sheet

CABLE PROTECTION SYSTEM

TECHNICAL FIELD

The present invention relates to a cable protection system, and in particular to a cable protection system used to channel and protect cables or flexible pipes such as computer network cables, power cables, fibre optic cables and hydraulic or pneumatic control lines laid within a cavity, such as a cavity defined by a false floor, wall or ceiling.

BACKGROUND

In the domain of structured cable installation, i.e. the installation of a computer network cable infrastructure, below a false floor, such as a false access floor comprising a grid of floor tiles 600 mm by 600 mm, suspended by their corners upon tubular pillars approximately 300 mm to 600 mm high, cables are generally laid directly onto the underlying floor which is typically a concrete floor. In this manner, laying the cables takes a minimal amount of time, but offers no protection to the cables.

Cables generally require some kind of protection. For example, Bulk Category 5 structured cabling and enhanced data cabling should be installed such that it is under near zero stress conditions. Excess stress, or pressure, can be put upon cables nearest to irregular concrete surfaces in particular. Changes in the geometry of a cable affects its return loss and attenuation characteristics and thus the overall performance of the network.

In the light of the foregoing, alternative installations have been developed and are referred to as cable management systems or CMS. By laying the cables onto metal baskets or trays fitted to the concrete floor, protection from the concrete floor is provided and containment for large volumes of cable is possible. However, since these baskets or trays are time consuming to install, they are far from ideal.

Datatray Systems Ltd provide an efficient modular CMS known as Datatray (TM). A welded wire grid with upturned edges forming unshaped channels is provided in prefabricated standard lengths. The channels can be interconnected on site with bolt-on connectors to form a variety of different channel paths for the cables. Channel bridges and junctions are also available and may be connected to the unshaped channels to form the complete system. Unfortunately, the inherent inflexibility of these welded wire grids requires the various modular components to be prefabricated, and thus a time consuming design, manufacture and installation process is necessary for each particular situation. Further, it has been found that the wire grid itself may damage the cabling when a large mass of cabling is laid within the CMS.

SUMMARY OF THE INVENTION

The aim of the present invention is to provide a cable protection system which may be designed and installed on-site, and which provides protection for the cables laid therein.

According to the present invention there is provided a cable protection system for cables laid in a cavity. The cable protection system comprises a continuous sheet of non-metallic material which can be cut to length and shaped during installation to receive the cables. Preferably, the sheet, in use, is shaped to define a channel. However it may be used flat, or such that it lines an existing channel, e.g. in an existing cable or basket tray installation.

Preferably, the material is class "O" fire rated. The material may also be a foam sheet. For example, either a closed cell cross-linked polyethylene foam such as Plastazote (RTM) or a class "O" fire rated, closed cell, expanded PVC nitrile neoprene foam would be appropriate. The sheet may have foldable edges for forming a channel with a substantially u-shaped section. Alternatively, the channel formed may define a plurality of ducts. Sides of the channel, in use, may be supported by spacing bars in the cavity.

The sheet may be high density foam and supplied to the site on rolls of any appropriate width. The sheet may be scored to provide fold lines to aid shaping of the sheet. A plurality of score lines may be provided to assist the shaping of the sheet into complex shapes.

The sheet is preferably impervious to moisture. This enables the sheet, especially when in the form of a channel, to protect the cables if the floor becomes flooded; data cabling generally requires replacement following flooding due to the water's effect on performance characteristics of the cable. Closed cell materials are generally impervious to moisture.

For a false floor system with floor tiles 600 mm by 600 mm, the rolls are preferably 1 m wide and two score lines are provided, each score line preferably being 200 mm from each side of the sheet.

Where the floor tiles are other than 600 mm by 600 mm and/or to accommodate different depths of u-shaped channel, 1 m wide sheets can be cut to other more suitable widths, on site, with a portable or semi-portable cutting machine or knife.

Cables are laid on the sheet (within the channel) of the cable tray system. If cable channels need to cross-over each other, or if a bridge is required, prefabricated bridges may be provided. These prefabricated bridges are preferably made from stamped aluminium.

BRIEF DESCRIPTION OF THE DRAWING

A specific embodiment of a cable protection system according to the present invention is now described, by way of example, with reference to the accompanying drawings, in which.

DETAILED DESCRIPTION

Figure 1:
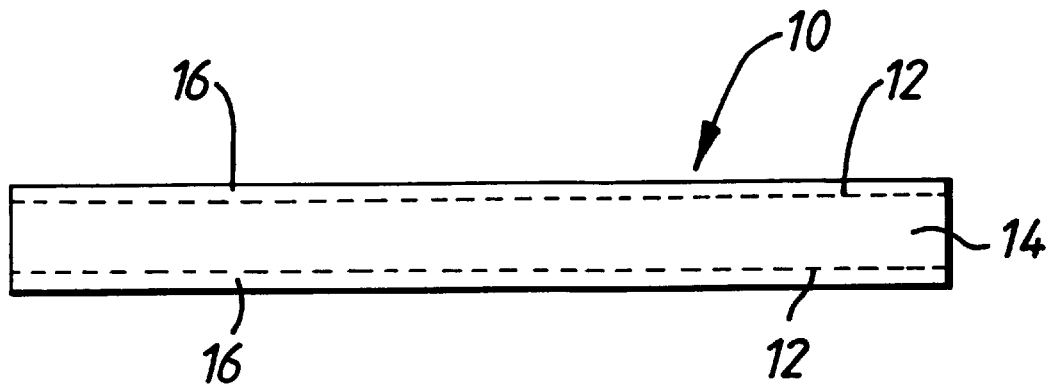
FIG. 1 shows a sheet of material suitable for use in a cable protection system according to the present invention.

Referring to FIG. 1, a sheet 10, cut from a roll of foam material, is shown. The sheet 10 has two score lines 12 defining a central strip 14 and two side strips 16.

The length of the sheet 10 is advantageously sufficient so as to allow a single sheet 10 to form a desired channel length. However, if necessary, two or more separate lengths of sheet 10 may be attached end to end by adhesive tape, or otherwise, to form the necessary length of sheet 10, thereby forming a continuous sheet.

The sheet 10 shown is 1 m wide, with the score lines 12 at a distance of 200 mm from each edge of the sheet 10. This leaves the central strip 14 with a width of about 600 mm.

Figure 2:
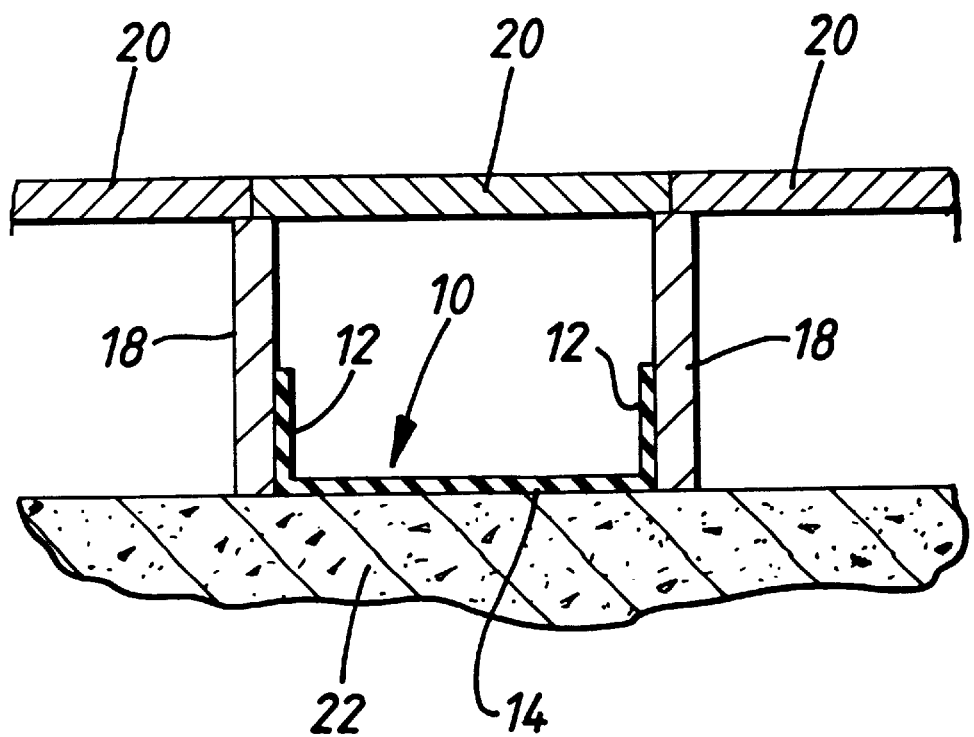
FIG. 2 is a section of the cable protection system between two pillars.

The sheet 10 is suitable for laying in a false floor cavity, as shown in FIG. 2. The false floor of FIG. 2 comprises pillars 18 (i.e. support bars) supporting floor tiles 20 spaced from, but substantially parallel to, a concrete floor 22. The sheet 10 is folded such that the two side strips 16 and central strip 14 form a u-shaped channel, the central strip 14 being laid directly onto the concrete floor 22, and the side strips 16 resting against the pillars 18. However, in an alternative embodiment, the sheet may simply be laid flat onto the floor, or within an existing cable tray or basket tray installation, thereby affording the cables extra protection from the cable tray itself or the wire mesh of a basket tray.

Cables are laid within the channel formed by the sheet 10. These cables may partially fill the channel, or be of sufficient quantity or size so as to become proud of the top of the channel.

In a cable network with multiple terminals, the cable protection system will require junctions to allow the multiple cables to run in more than one direction. With the present invention, these junctions can be made on site by simply cutting two or more converging sheets 10 as appropriate with a craft knife, or a saw, and joining the appropriately cut ends together with adhesive tape, hot melt glue, or otherwise. For example, a "cross-road" junction could be made by cutting an appropriate section out of the side walls of the two crossing sheets 10, laying the central strip 14 of the first sheet 10 onto the central strip 14 of the second sheet 10, and finally joining the now adjacent ends of the side strips 16 together.

It may also be possible simply to lay converging sheets 10 end to end without actually physically joining them together whilst still maintaining a "continuous sheet" effect. In this manner, the time required to fit the cable protection system would be reduced, without substantially reducing the effectiveness of it. Further, this would allow the cable protection system to be reusable since the sheets 10 could be easily removed without further damaging them. This would be advantageous, for example, in the music industry, where touring bands move from venue to venue requiring much electrical cable to be laid down only for one or two nights, prior to moving on to the next venue.

Occasionally, cross-overs or bridges are required so that crossing cable paths do not interfere with each other. These cross-overs or bridges can easily be achieved by merely stacking the cable paths on top of each other, since the foam material will provide cushioning between the stacked cable paths. Alternatively, by using prefabricated cross-over or bridging sections, such as stamped aluminium sections, additional support and physical separation of the crossing cable paths can be provided.

The cable protection system of the present invention is easy to fit to the confined space of a false floor, wall or ceiling cavity due to the inherent flexibility of the sheet material. Whereas a metal wire mesh is stiff and unaccommodating to non-straight channel paths, the non-metallic material can easily be adjusted to fit around corners or through an over- or undersized gap. Further, since there is no need to bolt sections together, there is no searching for dropped nuts, washers and bolts or fiddly connections to make. A single strip of adhesive tape, or a single pass of hot adhesive from a glue gun, will reliably connect the sheets 10 together. The sheets 10 can also easily be cut to fit around obstacles, if required.

The sheet 10 is preferably made from a closed cell cross-linked polyethylene foam such as Plastazote (RTM), which is available in at least 2 mm, 3 mm, 5 mm, 13 mm and 25 mm thicknesses or a class "O" fire rated, closed cell, expanded PVC nitrile neoprene foam. The thickness used for the sheet 10 will depend on the type of cable being laid. For example, if delicate cables are being used, then a thicker sheet 10 may be preferable so as to provide more protection for the cables.

Plastazote (RTM), and the like, has many advantageous characteristics above and beyond those of wire grids. These advantages include a low mass, a wide range of safe operating conditions (temperature, humidity), good sustained compression characteristics, and low burn characteristics due to its tendency to melt away from a flame and self extinguish without substantial smoking.

An advantage of the cable protection system of the present invention is the speed and ease with which the system can be laid down. Firstly, there is no need for the sheets to be physically attached to the concrete floor since it will naturally mould itself to the roughness of the concrete, thus reducing the likelihood of moving. The prior art Datatray (RTM) system suggests bolting or gluing it to the floor. Secondly, the joints between channels are easily formed. And thirdly, since most non-metallic materials are electrical insulators, there is generally no requirement for the cable protection system of the present invention to be earthed. These advantages have been found to give a saving of between 60 and 70 percent on the installation time.

The present invention has been described above purely by way of example. It should be noted that modifications in detail can be made within the scope of the invention.

What is claimed is:

1. A cable protection system for cables laid in a cavity, the cable protection system comprising a continuous sheet of non metallic material which can be cut to length and shaped during installation to receive cables along its length.

2. A cable protection system according to claim 1 wherein, in use, the system lines an existing channel.

3. A cable protection system according to claim 1, wherein the material is class "O" fire rated.

4. A cable protection system according to claim 1, wherein the material is a foam sheet.

5. A cable protection system according to claim 4, wherein the material is closed cell.

6. A cable protection system according to claim 1, wherein the material is an expanded PVC nitrile neoprene foam.

7. A cable protection system according to claim 1, wherein the material is a cross linked polyethylene foam.

8. A cable protection system according to any of claim 1, wherein the sheet can be shaped to define a channel.

9. A cable protection system according to claim 8, wherein the sheet has foldable edges for forming the channel.

10. A cable protection system according to claim 8, wherein the channel formed defines a plurality of ducts.

11. A cable protection system according to claim 1, wherein the sheet is supplied as a roll of material.

12. A cable protection system according to claim 1, wherein the sheet is scored to provide fold lines to aid shaping of the sheet.

13. A cable protection system according to claim 1, wherein the sheet is 1 m wide and scored 200 mm from each edge of the sheet.

14. A cable protection system according to claim 1, wherein the sheet is impervious to moisture.

15. A cable protection system according to claim 1, wherein the sheet provides protection for cables laid thereon from flooding.

16. A building including at least one cavity accommodating cables, wherein the cables are protected by a cable protection system comprising a continuous sheet of non metallic material which can be cut to length and shaped during installation to receive the cables along its length.

17. A building according to claim 16, the cavity comprising spacing bars and the cable protection system being formed into a channel having sides, wherein the sides of the channel are supported by the spacing bars in the cavity.

* * * * *